United States Patent
Lei et al.

(10) Patent No.: US 8,671,888 B1
(45) Date of Patent: Mar. 18, 2014

(54) CAT TOILET DEVICE

(71) Applicants: Ping Yu Lei, New Taipei (TW); Cheng Han Hsiao, New Taipei (TW)

(72) Inventors: Ping Yu Lei, New Taipei (TW); Cheng Han Hsiao, New Taipei (TW)

( * ) Notice: Subject to any disclaimer, the term of this patent is extended or adjusted under 35 U.S.C. 154(b) by 0 days.

(21) Appl. No.: 13/669,469

(22) Filed: Nov. 6, 2012

(51) Int. Cl.
*A01K 1/01* (2006.01)

(52) U.S. Cl.
USPC .......................................... 119/162

(58) Field of Classification Search
USPC ......................... 119/162, 161, 163
See application file for complete search history.

(56) References Cited

U.S. PATENT DOCUMENTS

| 2,584,656 | A | * | 2/1952 | Anderson | 119/162 |
| 3,757,738 | A | * | 9/1973 | Hall | 119/162 |
| 4,437,430 | A | * | 3/1984 | DeBardeleben | 119/162 |
| 5,103,772 | A | * | 4/1992 | Schmid | 119/162 |
| 5,622,139 | A | * | 4/1997 | Rymer | 119/162 |
| 6,014,946 | A | * | 1/2000 | Rymer | 119/162 |
| 6,418,880 | B1 | * | 7/2002 | Chiu | 119/162 |
| 6,487,989 | B2 | * | 12/2002 | Yamamoto | 119/161 |
| 6,701,539 | B1 | * | 3/2004 | Hogan | 4/235 |
| 7,395,784 | B2 | * | 7/2008 | Hirokawa et al. | 119/165 |
| 7,882,805 | B2 | * | 2/2011 | Yu | 119/162 |
| 7,963,251 | B2 | * | 6/2011 | Lapidge et al. | 119/162 |
| 8,051,804 | B1 | * | 11/2011 | Rescate | 119/162 |
| 2002/0078899 | A1 | * | 6/2002 | Chiu | 119/162 |

* cited by examiner

*Primary Examiner* — Yvonne Abbott

(57) ABSTRACT

A cat toilet device includes a bottom part, a seat and a top part. The seat has a lip extending inward therefrom so as to support the top part. The top part has multiple apertures and a side hole is defined through a side of the top part. The cat is trained to use the cat toilet device to save the need of the cat litter. A slot is defined in the top face of the seat and a cup is engaged with the slot so as to receive tools for clearing the cat toilet.

1 Claim, 3 Drawing Sheets

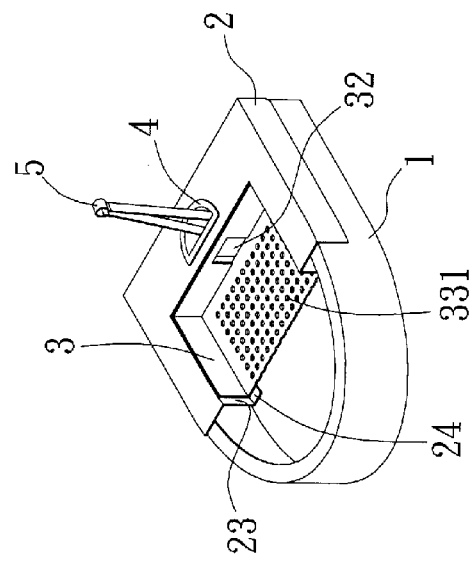
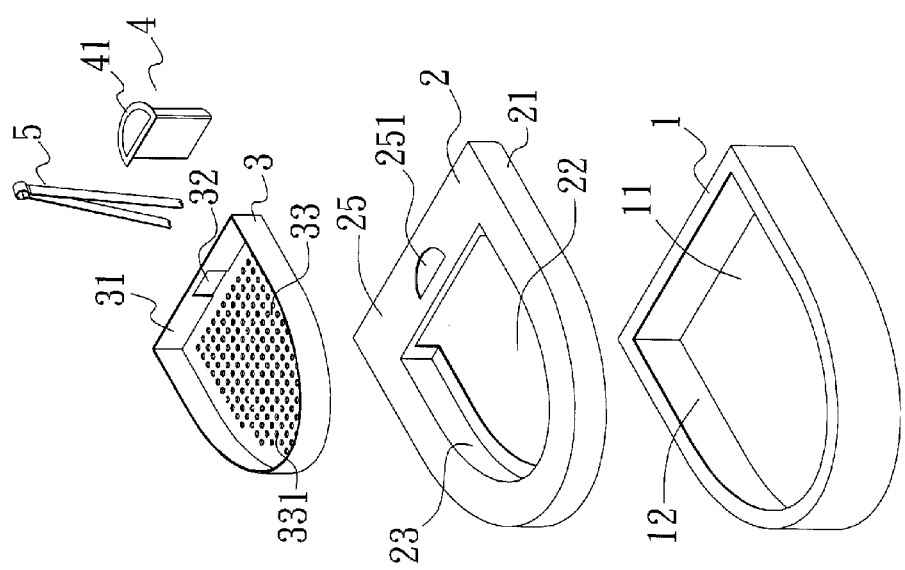

CAT TOILET DEVICE

FIELD OF THE INVENTION

The present invention relates to a pet toilet, and more particularly, to a cat toilet which is easily cleaned and keeps the environment clean.

BACKGROUND OF THE INVENTION

The conventional cat toilet device is simply a basin which is put at a desired position and cat litter is located in the basin, the cat is trained to leave the feces on the cat litter. After the cat litter is used for a period of time, the cat litter together with the feces and urine are discarded. The basin is then cleaned and filled with the cat litter.

However, the cat litter is not solved and not environmentally friendly so that some manufacturers develop water-solvable cat litter which can be flushed into the toilet. It is noted that the amount of the cat litter is significant and bed smell generates from the used cat litter, the bad smell makes the room not suitable for people living in the room.

The present invention intends to provide a cat toilet device which is easily used and keeps the environment clean and neat. The present invention also saves expenses for purchasing of the cat litter.

SUMMARY OF THE INVENTION

The present invention relates to a cat toilet device and comprises a bottom part having a recessed area defined therein and a wall extends from the periphery of the recessed area. A seat has an outer wall extending downward from the periphery of the top face thereof. A through hole is defined through the top face and has an inner periphery. A lip extends inward from the inner periphery of the seat. A top part is located within the through hole of the seat and multiple apertures are defined through the top part.

The primary object of the present invention is to provide a cat toilet device which is easily cooperated with the toilet bowl and the cat feces is easily cleaned to keep the room clean. The present invention also saves the expenses of the cat litter.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is an exploded view to show the cat toilet device of the present invention;

FIG. 2 is a perspective view to show the cat toilet device of the present invention, wherein a part of the seat is removed;

DETAILED DESCRIPTION OF THE PREFERRED EMBODIMENT

Figure 4:
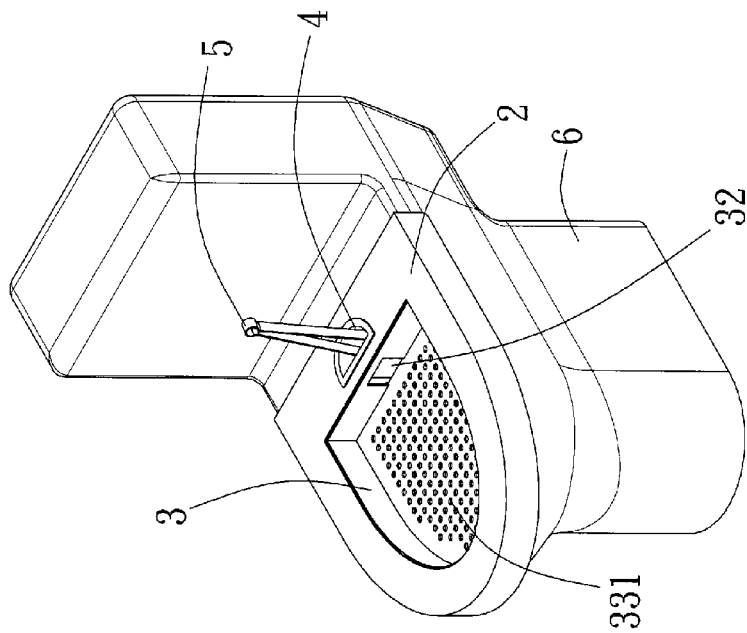
FIG. 4 is a perspective view to show that the cat toilet device as shown in FIG. 3 is mounted to the toilet bowl.

Referring to FIGS. 1 and 2, the cat toilet device of the present invention comprises a bottom part 1 having a recessed area 11 defined therein and a wall 12 extends from the periphery of the recessed area 11. A seat 2 is engaged with the wall 12 and has an outer wall 21 extending downward from the periphery of the top face 25 thereof. A through hole 22 is defined through the top face 25 and has an inner periphery 23 which is parallel to the outer wall 21. A lip 24 extends inward from the inner periphery 23 of the seat 2 so that a top part 3 is rested on the lip 24. The top face 25 of the seat 2 has a slot 251 defined therethrough so as to accommodate a cup 5 in which cleaning tool is inserted.

The top part 3 has a recessed room and is located within the through hole 22 of the seat 2. A wall 31 extends upward from the periphery of the top part 3. The width of the top part 3 is less than the width of the through hole 22 of the seat 2, so that the top part 3 is located in the through hole 22 of the seat 2. The wall 31 of the top part 3 has side hole 32 defined therethrough. Multiple apertures 331 are defined through the bottom pate 33 of the top part 3. The apertures 331 are circular, rectangular, square, triangular, rhombus apertures or any known shape. The apertures 331 may be defined perpendicularly, inclinedly or in any direction through the bottom pate 33 of the top part 3. The side hole 32 is a circular, square, rectangular, semi-circular, triangular hole or any shaped hole. The seat 2 can be integral with the top part 3.

The cup 4 can be any shape and has a flange 41 extending outward from a top thereof so as to be supported by the top surface defining the slot 251 to prevent the cup 4 from dropping through the slot 251. The cup 4 accommodates cleaning tools 5 therein.

A cover (not shown) is used to cover the slot 251 up. When no cup 4 is engaged with the slot, the cover is used to cover up the slot 251 to prevent the cat to play with the slot 251 which attaches cats.

During the first stage of training of the cat to use the cat toilet device, the top part 3 is engaged with the through hole 22 of the seat 2, and the lip 24 contacts the top part 3. The seat 2 and the top part 3 are then put on the bottom part 1. The top part 3 is used to receive the cat litter therein which is the conventional cat litter or the water-solvable cat litter. When the cat urinates, the urine drains from the apertures 331 of the bottom plate 33 of the top part 3, and is collected in the recessed area 11 of the bottom part 1. The user pours and cleans the collected urine daily to increase the use period of the cat litter.

Figure 3:
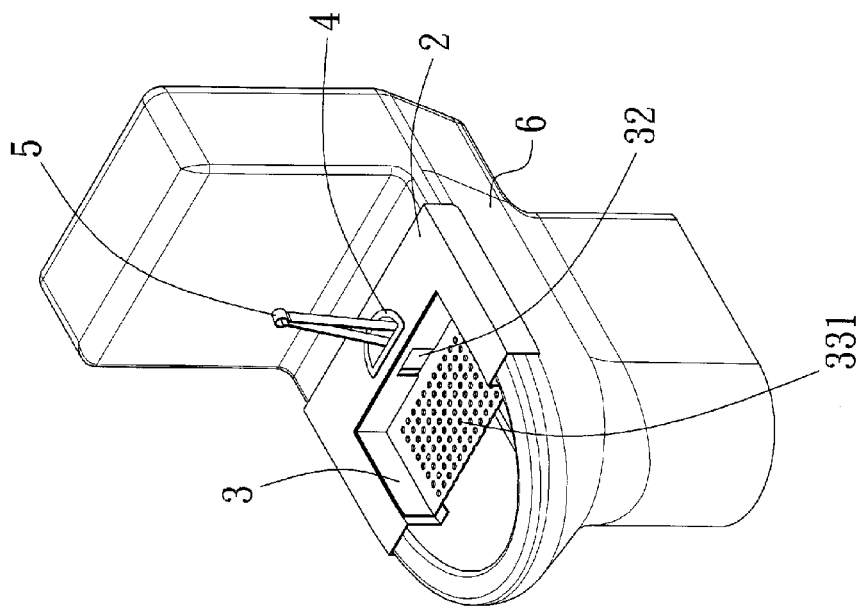
FIG. 3 is a perspective view, partly removed, to show that the cat toilet device, without the bottom part, is mounted to the toilet bowl.
Figure 5:
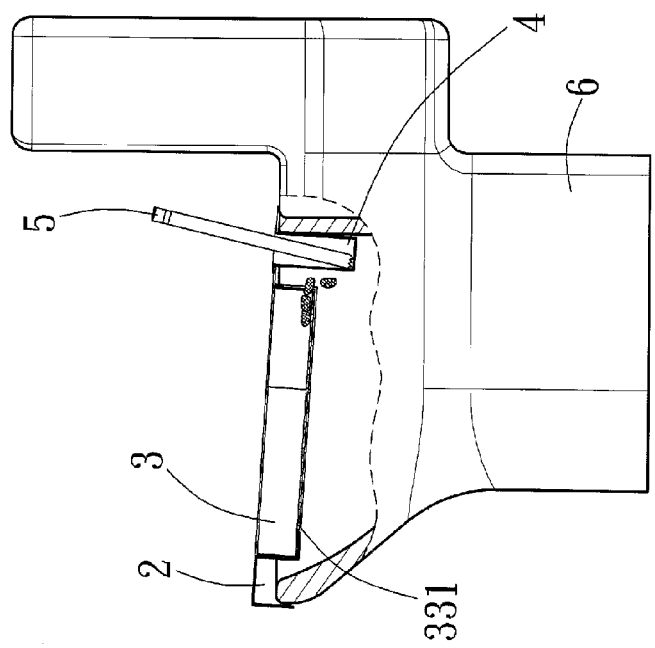
FIG. 5 is a cross sectional view to show that the cat toilet device of the present invention is mounted to the toilet bowl.

As shown In FIGS. 3 to 5, after a period of training, the bottom part 1 is removed and the combination of the seat 2 and the top part 3 are mounted to the toilet bowl 6, the amount cat litter required can be reduced and preferably, the water solvable cat litter is recommended. When the cat urinates, the urine drains from the apertures 331 of the bottom plate 33 of the top part 3 into the toilet bowl 6 so that the user flushes the urine by the toilet. When the cat delivers the feces into the cat toilet device, the user simply uses a tool 5 to move the feces together with the cat litter into the toilet bowl 6 via the side hole 32. The user can also directly remove the feces into the toilet bowl 6 and flushes it away. As shown in FIG. 5, when cleaning the cat toilet device, the user tilts the cat toilet device, the cat litter flows into the toilet bowl 6 via the side hole 32 and the cat litter can be flushed away. The top part 3 is then easily cleaned by water.

Figure 6:
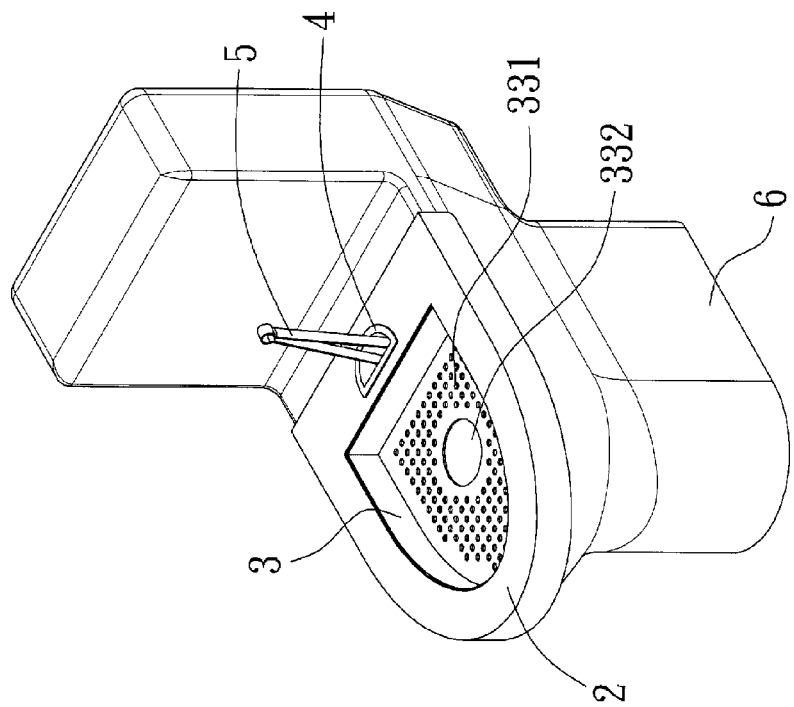
FIG. 6 is a perspective view to show another embodiment of the cat toilet device of the present invention.

As shown in FIG. 6, when the cat is trained to use the cat toilet device routinely, the top part 3 is changed to have a central hole 332 and the apertures 331 are located around the central hole 332. Because the cat is afraid of the larger hole so that the size of the central hole 332 can be gradually increased. The cat is gradually used to use the cat toilet device with the larger central hole 332 and the amount of the cat litter can be gradually reduced. When the cat is trained to use the cat toilet device without the cat litter, the cat toilet device can be removed from the toilet bowl 6. From now on, the cat can use the toilet bowl 6 without cat litter needed.

While we have shown and described the embodiment in accordance with the present invention, it should be clear to those skilled in the art that further embodiments may be made without departing from the scope of the present invention.

What is claimed is:

1. A cat toilet device comprising:
   a bottom part having a recessed area defined therein and a wall extending from a periphery of the recessed area;
   a seat having an outer wall extending downward from a periphery of a top face thereof, the top face of the seat has a slot defined therethrough, a cover covers the slot up, the slot accommodates a cup, the cup has a flange extending outward from a top thereof, a through hole defined through the top face and having an inner periphery, a lip extending inward from the inner periphery of the seat, and
   a top part located within the through hole of the seat and multiple apertures defined through the top part.

* * * * *